(12) United States Patent
Choi et al.

(10) Patent No.: US 11,626,597 B2
(45) Date of Patent: Apr. 11, 2023

(54) SEPARATOR FOR FUEL CELL AND FUEL CELL INCLUDING THE SAME

(71) Applicants: Hyundai Motor Company, Seoul (KR); Kia Motors Corporation, Seoul (KR)

(72) Inventors: Sung Bum Choi, Gyeonggi-do (KR); Kyung Min Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 248 days.

(21) Appl. No.: 17/076,311

(22) Filed: Oct. 21, 2020

(65) Prior Publication Data

US 2021/0305591 A1 Sep. 30, 2021

(30) Foreign Application Priority Data

Mar. 25, 2020 (KR) .................. 10-2020-0036275

(51) Int. Cl.
*H01M 8/0258* (2016.01)
*H01M 8/1004* (2016.01)
*H01M 8/0247* (2016.01)
*H01M 8/023* (2016.01)

(52) U.S. Cl.
CPC ....... *H01M 8/0258* (2013.01); *H01M 8/0247* (2013.01); *H01M 8/1004* (2013.01); *H01M 8/023* (2013.01)

(58) Field of Classification Search
CPC ................. H01M 8/023–8/0239; H01M 4/861
See application file for complete search history.

(56) References Cited

U.S. PATENT DOCUMENTS

| 7,374,838 | B2* | 5/2008 | Gallagher | ........... | H01M 8/0234 |
| | | | | | 429/534 |
| 2003/0039876 | A1* | 2/2003 | Knights | ............ | H01M 8/04089 |
| | | | | | 429/479 |
| 2011/0207026 | A1* | 8/2011 | Tseng | .................... | H01M 8/023 |
| | | | | | 429/515 |

FOREIGN PATENT DOCUMENTS

KR 100826435 B1 4/2008
WO WO 2021/213613 * 10/2021

* cited by examiner

*Primary Examiner* — Jonathan Crepeau
(74) *Attorney, Agent, or Firm* — Fox Rothschild LLP (57) ABSTRACT

A fuel cell includes a separator. A constant amount of air is supplied to the fuel cell irrespective of positions within an air channel, and thus, degradation of the fuel cell is prevented. The separator includes a separator body and a porous structure which has a plurality of pores defined therein to provide a path through which a fluid flows, where the separator body includes: a fluid inlet part having a space into which the fluid is introduced; a reaction region configured to receive the fluid; and a diffusion part which is provided between the fluid inlet part and the reaction region, where the porous structure is stacked on one surface of the reaction region, and the number of pores per unit volume of the porous structure varies in an inlet region.

6 Claims, 5 Drawing Sheets

SEPARATOR FOR FUEL CELL AND FUEL CELL INCLUDING THE SAME

CROSS-REFERENCE TO RELATED APPLICATION(S)

This application claims under 35 U.S.C. § 119(a) the benefit of Korean Patent Application No. 10-2020-0036275, filed on Mar. 25, 2020, which is hereby incorporated by reference herein.

BACKGROUND

(a) Technical Field

Exemplary embodiments relate to a separator for a fuel cell and a fuel cell including the separator.

(b) Description of the Related Art

Fuel cells, which generate electricity from a reaction between a fuel (for example, hydrogen) and air, generally include: a membrane electrode assembly (MEA) including a membrane, a fuel electrode, and an air electrode; a gas diffusion layer in which the fuel and air diffuse; and a separator. Among the constituents described above, the separator is configured to face each of the fuel electrode and the air electrode and has roles in discharging, to the outside, water produced by a reaction inside a fuel cell while supplying fuel and air from the outside and in providing a path through which current generated by the reaction inside the fuel cell is able to flow.

Here, in the separator, each of an air channel serving as a path through which the air flows and a fuel channel serving as a path through which the fuel flows is provided, and a manifold for supplying the outside fuel and air to the fuel channel and the air channel, respectively, is provided.

However, according to the related art, amounts of air supply between a region of the air channel relatively close to the manifold and a region of the air channel relatively far from the manifold are not uniform. In this case, the air is more smoothly supplied to the region of the air channel relatively close to the manifold that supplies the air, and thus, an electrochemical reaction of the MEA more actively occurs in that region than in other regions. Accordingly, degradation of the fuel cell occurs earlier in the region adjacent to the manifold that supplies the air. Particularly, this degradation occurs more severely in the region to which the air is most directly supplied from the manifold. For example, according to the related art, the degradation of the fuel cell heavily occurs in a region closest to the manifold in an inlet region of the air channel.

SUMMARY

Exemplary embodiments of the present disclosure is to supply a constant amount of air to a fuel cell irrespective of positions within an air channel to prevent degradation of the fuel cell.

A first aspect of the present disclosure provides a separator for a fuel cell, including: a separator body; and a porous structure which is stacked on one surface of the separator body and has a plurality of pores defined therein to provide a path through which a fluid flows, wherein the separator body includes: a fluid inlet part having a space into which the fluid is introduced; a reaction region configured to receive the fluid; and a diffusion part which is provided between the fluid inlet part and the reaction region and has a passage to provide a path through which the fluid within the fluid inlet part is supplied to the reaction region, wherein the porous structure is stacked on one surface of the reaction region, and the number of pores per unit volume of the porous structure in an inlet region (A1, hereinafter, referred to as a 'closest inlet region (A1)' or a first inlet region), which is closest to the fluid inlet part in an inlet region of the porous structure facing the diffusion part, is less than the number of pores per unit volume of the porous structure in a second inlet region except for the first/closest inlet region (A1) in the inlet region of the porous structure facing the diffusion part.

The number of pores per unit volume of the porous structure in the inlet region of the porous structure may be less than the number of pores per unit volume of the porous structure in the other regions except for the inlet region in the porous structure.

The fluid may be air.

The reaction region may include a first reaction region and a second reaction region, and the porous structure may include: a first porous structure stacked on one surface of the first reaction region; and a second porous structure stacked on one surface of the second reaction region, wherein the first reaction region and the second reaction region are disposed so that a distance between the first reaction region and the fluid inlet part is less than a distance between the second reaction region and the fluid inlet part, and the number of pores per unit volume in the inlet region of the first porous structure is less than the number of pores per unit volume in the inlet region of the second porous structure.

The reaction region may further include a third reaction region, and the porous structure may further include a third porous structure stacked on one surface of the third reaction region, wherein the third reaction region is disposed so that a distance between the second reaction region and the fluid inlet part is less than a distance between the third reaction region and the fluid inlet part, and the number of pores per unit volume of the third porous structure is constant over all regions of the third porous structure.

In other regions except for the inlet regions of the first to third porous structures, the numbers of pores per unit volume of the first to third porous structures may be the same as each other.

A second aspect of the present disclosure provides a separator for a fuel cell, including: a separator body; and a porous structure which is stacked on one surface of the separator body and has a plurality of pores defined therein to provide a path through which a fluid flows, wherein the separator body includes: a fluid inlet part having a space into which the fluid is introduced; a reaction region configured to receive the fluid; and a diffusion part which is provided between the fluid inlet part and the reaction region and has a passage to provide a path through which the fluid within the fluid inlet part is supplied to the reaction region, wherein the porous structure is stacked on one surface of the reaction region, and an inlet region (F1, hereinafter, referred to as a 'same height inlet region (F1)' or a first inlet region), which is provided at the same height as the fluid inlet part in a height direction (h) in an inlet region of the porous structure facing the diffusion part, is provided closer to a central region of the porous structure than a second inlet region except for the first/same height inlet region (F1) in the inlet region of the porous structure facing the diffusion part.

The inlet region of the porous structure may be closer to the central region of the porous structure as the inlet region is closer to the fluid inlet part in the height direction (h) of the fluid inlet part.

A boundary of outlet region of the porous structure provided on an opposite side of the inlet region of the porous structure may extend in a direction perpendicular to a direction in which the porous structure extends from the inlet region to the outlet region.

The reaction region may include a first reaction region and a second reaction region, and the porous structure may include: a first porous structure stacked on one surface of the first reaction region; and a second porous structure stacked on one surface of the second reaction region, wherein the first reaction region and the second reaction region are disposed so that a difference in height between the first reaction region and the fluid inlet part is less than a difference in height between the second reaction region and the fluid inlet part, and a distance between the inlet region of the first porous structure and the fluid inlet part is the same as a distance between the inlet region of the second porous structure and the fluid inlet part.

A third aspect of the present disclosure provides a separator for a fuel cell, including: a separator body; and a porous structure which is stacked on one surface of the separator body and has a plurality of pores defined therein to provide a path through which a fluid flows, wherein the separator body includes: a fluid inlet part having a space into which the fluid is introduced; a reaction region configured to receive the fluid; and a diffusion part which is provided between the fluid inlet part and the reaction region and has a passage to provide a path through which the fluid within the fluid inlet part is supplied to the reaction region, wherein the porous structure is stacked on one surface of the reaction region, and a passage formation region (D1) facing a passage of the diffusion part is provided in an inlet region (A1, hereinafter, referred to as a 'closest inlet region (A1)' or first inlet region), which is closest to the fluid inlet part in an inlet region of the porous structure facing the diffusion part, and a pore formation region (D2) having a porous pore structure is provided in a second inlet region except for the first/passage formation inlet region (D1) in the porous structure.

The passage formation region (D1) of the porous structure may have a shape protruding toward a central region of the porous structure as the passage formation region (D1) is closer to the fluid inlet part in a height direction (h) of the fluid inlet part.

The reaction region may include a first reaction region and a second reaction region, and the porous structure may include: a first porous structure stacked on one surface of the first reaction region; and a second porous structure stacked on one surface of the second reaction region, wherein the first reaction region and the second reaction region are disposed so that a distance between the first reaction region and the fluid inlet part is less than a distance between the second reaction region and the fluid inlet part, and the passage formation region (D1) provided in the inlet region of the first porous structure has a shape further protruding from the passage formation region (D1) provided in the inlet region of the second porous structure toward a central region of the porous structure.

A fourth aspect of the present disclosure provides a fuel cell including: a membrane electrode assembly (MEA) including a membrane, a fuel electrode, and an air electrode; a gas diffusion layer stacked on one surface of the MEA; and a separator stacked on one surface of the gas diffusion layer, wherein the separator includes: a separator body; and a porous structure which is stacked on one surface of the separator body and has a plurality of pores defined therein to provide a path through which a fluid flows, wherein the separator body includes: a fluid inlet part having a space into which the fluid is introduced; a reaction region configured to receive the fluid; and a diffusion part which is provided between the fluid inlet part and the reaction region and has a passage to provide a path through which the fluid within the fluid inlet part is supplied to the reaction region, wherein the porous structure is stacked on one surface of the reaction region, and the number of pores per unit volume of the porous structure in an inlet region (A1, hereinafter, referred to as a 'closest inlet region (A1)' or first inlet region), which is closest to the fluid inlet part in an inlet region of the porous structure facing the diffusion part, is less than the number of pores per unit volume of the porous structure in a second inlet region except for the first/closest inlet region (A1) in the inlet region of the porous structure facing the diffusion part.

A fifth aspect of the present disclosure provides a fuel cell including: a membrane electrode assembly (MEA) including a membrane, a fuel electrode, and an air electrode; a gas diffusion layer stacked on one surface of the MEA; and a separator stacked on one surface of the gas diffusion layer, wherein the separator includes: a separator body; and a porous structure which is stacked on one surface of the separator body and has a plurality of pores defined therein to provide a path through which a fluid flows, wherein the separator body includes: a fluid inlet part having a space into which the fluid is introduced; a reaction region configured to receive the fluid; and a diffusion part which is provided between the fluid inlet part and the reaction region and has a passage to provide a path through which the fluid within the fluid inlet part is supplied to the reaction region, wherein the porous structure is stacked on one surface of the reaction region, and an inlet region (F1, hereinafter, referred to as a 'same height inlet region (F1)' or first inlet region), which is provided at the same height as the fluid inlet part in an inlet region of the porous structure facing the diffusion part, is provided closer to a central region of the porous structure than a second inlet region except for the first/same height inlet region (F1) in the inlet region of the porous structure facing the diffusion part.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a separator for a fuel cell and a fuel cell including the separator according to the present disclosure will be described with reference to the accompanying drawings.

Figure 1:
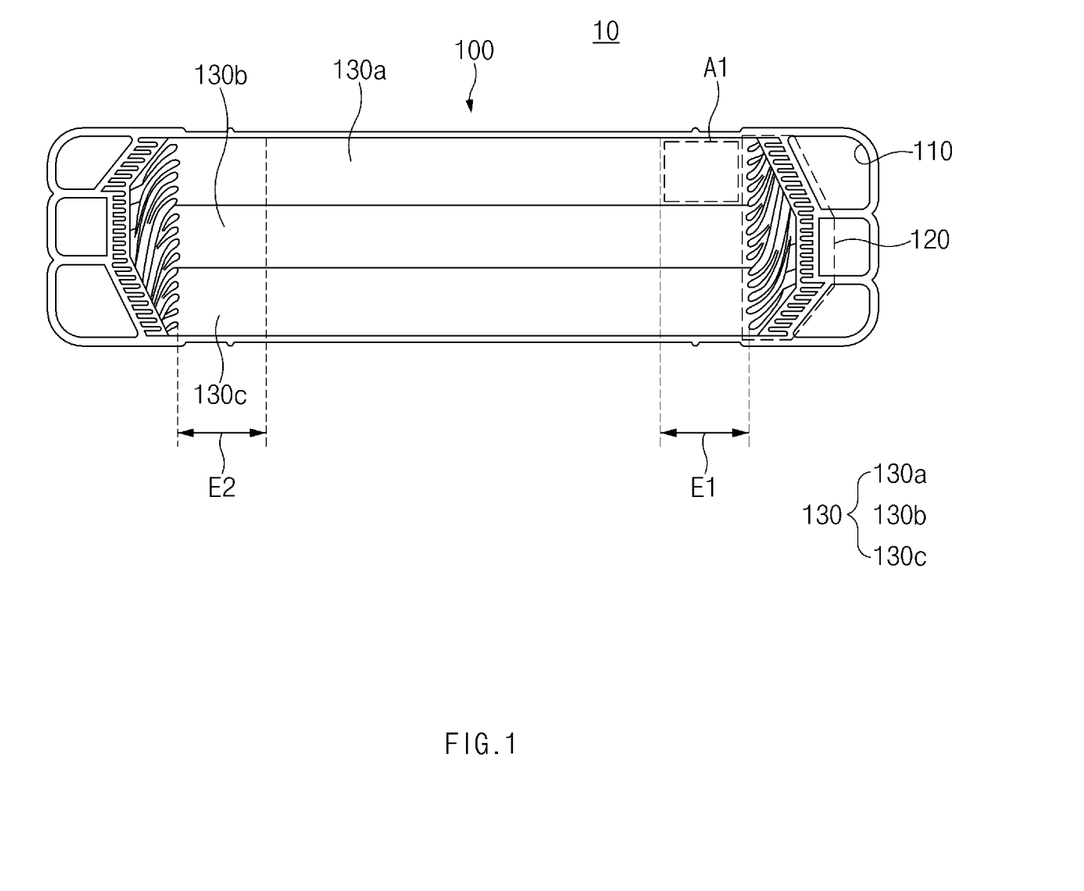
FIG. 1 is a plan view illustrating a structure of a separator for a fuel cell according to a first exemplary embodiment of the present disclosure.
Figure 2:
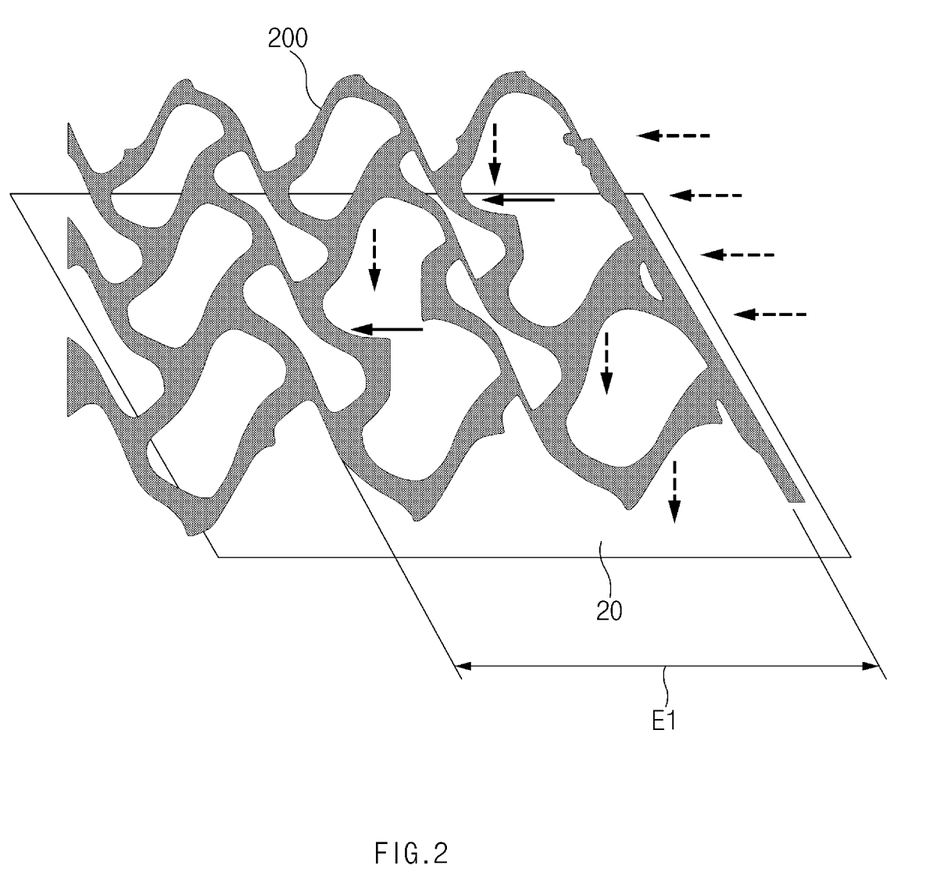
FIG. 2 is an enlarged perspective view of a porous structure and a configuration around the porous structure in a fuel cell equipped with the separator for a fuel cell according to the first exemplary embodiment of the present disclosure.

FIG. 1 is a plan view illustrating a structure of a separator for a fuel cell according to a first exemplary embodiment of the present disclosure, and FIG. 2 is an enlarged perspective view of a porous structure and a configuration around the porous structure in a fuel cell equipped with the separator for a fuel cell according to the first exemplary embodiment of the present disclosure.

As illustrated in FIG. 1, a separator for a fuel cell (hereinafter, referred to as a separator 10) according to the present disclosure may include a separator body 100.

The separator body 100 may include: a fluid inlet part 110 having a space into which a fluid is introduced; a reaction region 130 to receive the fluid from the fluid inlet part 110; and a diffusion part 120 which is provided between the fluid inlet part 110 and the reaction region 130 and has a passage to provide a path through which the fluid within the fluid inlet part 110 is supplied to the reaction region 130.

As illustrated in FIG. 2, according to the present disclosure, a reaction surface 20 including an electrode is provided in a fuel cell, and the reaction surface 20 may have a structure stacked on one surface of the reaction region 130 of the separator 10. The fluid supplied to the fluid inlet part 110 is supplied to the reaction region 130 via the diffusion part 120, and then, the fluid supplied to the reaction region 130 is supplied again to the reaction surface 20 including the electrode. An electrochemical reaction may occur on the reaction surface 20 by the fluid supplied to the reaction surface 20, thereby generating current in the fuel cell.

Here, the fluid may be air. Thus, the fluid introduced to the fluid inlet part 110 may also be air. Also, in addition to the air, a fuel (for example, hydrogen) may also be introduced to the separator 10. Thus, the fuel cell according to the present disclosure may be configured to generate the current by a reaction between the hydrogen and the oxygen inside the air.

Here, as illustrated in FIG. 2, in the separator 10 according to the present disclosure, a porous structure 200 may be stacked on one surface of the separator body 100. In particular, the porous structure 200 may be stacked on one surface of the reaction region 130.

The porous structure 200 has a plurality of pores defined therein to provide a path through which the fluid supplied to the reaction region 130 flows, and also has a role in changing a passage of the fluid supplied to the reaction region 130 and supplying the fluid to the reaction surface 20.

That is, the fluid introduced to the reaction region 130 flows through the pores provided in the porous structure 200, and collides with a structure providing a body of the porous structure 200. A movement direction of the fluid, colliding with the structure providing the body of the porous structure 200, may be changed into a direction toward the reaction surface 20. The fluid, of which the movement direction has changed, is supplied to the reaction surface 20, and thus, the electrochemical reaction may occur on the reaction surface 20.

Also, referring to FIG. 1, the reaction region 130 provided in the separator 10 may have a plurality of regions. For example, the reaction region 130 may include a first reaction region 130a, a second reaction region 130b, and a third reaction region 130c. Here, FIG. 1 illustrates a state in which the first to third reaction regions 130a, 130b, and 130c are partitioned separately from each other. However, unlike this configuration, the plurality of reaction regions including the first to third reaction regions 130a, 130b, and 130c may be connected and integrated with each other.

Also, as described above, the porous structure 200 may be stacked on the one surface of the reaction region 130, and the reaction region 130 may include the first to third reaction regions 130a, 130b, and 130c. Thus, the porous structure 200 may include a first porous structure stacked on one surface of the first reaction region 130a, a second porous structure stacked on one surface of the second reaction region 130b, and a third porous structure stacked on one surface of the third reaction region 130c. The first to third porous structures may be partitioned separately from each other, but unlike this configuration, the first to third porous structures may be connected and integrated with each other.

Also, the first to third reaction regions 130a, 130b, and 130c may be arranged in one direction on the basis of a distance from the fluid inlet part 110. That is, as illustrated in FIG. 1, the first reaction region 130a and the second reaction region 130b may be disposed so that a distance between the first reaction region 130a and the fluid inlet part 110 is less than a distance between the second reaction region 130b and the fluid inlet part 110. Also, the second reaction region 130b and the third reaction region 130c may be disposed so that a distance between the second reaction region 130b and the fluid inlet part 110 is less than a distance between the third reaction region 130c and the fluid inlet part 110.

According to one aspect of the present disclosure, the density of pores defined in the porous structure 200 provided in the separator 10 may change depending on positions. That is, according to the first exemplary embodiment, when a region of the porous structure 200, which faces the diffusion part 120, is referred to as an 'inlet region E1', and an inlet region A1 of the inlet region E1, which is closest to the fluid inlet part 110, is referred to as a 'closest inlet region', the number of pores per unit volume of the porous structure 200 in the closest inlet region A1 may be less than the number of pores per unit volume of the porous structure 200 in an inlet region except for the closest inlet region A1 in the inlet region E1 of the porous structure 200. The small number of pores per unit volume may be understood as an average size of the pores is large.

According to the related art, the closest inlet region A1 of the porous structure 200 is closest to the fluid inlet part 110, and thus, a large amount of the fluid discharged from the fluid inlet part 110 may supplied to the closest inlet region A1 of the porous structure 200 and a region of the reaction region facing the closest inlet region A1. In this case, however, in the closest inlet region A1, a large amount of the fluid is supplied to the reaction surface due to the collision with the porous structure 200, and thus, the electrochemical reaction heavily occurs on the reaction surface facing the closest inlet region A1, which causes the degradation.

According to the first exemplary embodiment of the present disclosure, the number of pores per unit volume of the porous structure 200 in the closest inlet region A1 of the porous structure 200 is relatively small, and thus, as illustrated in FIG. 2, a structure providing the body of the porous structure 200 has a relatively low density in the closest inlet region A1. Thus, the frequency of collisions between the porous structure 200 and the fluid which, of the fluid (that is, the air) supplied to the reaction region 130, passes through the closest inlet region A1 of the porous structure 200 is reduced, and thus, an amount of the fluid supplied to the reaction surface 20 is also reduced. Thus, a relatively little electrochemical reaction occurs in the reaction surface 20 facing the closest inlet region A1. That is, according to the present disclosure, the degradation may be prevented from occurring on the reaction surface 20 facing the closest inlet region A1 of the porous structure 200. Here, in a case where each of the reaction region 130 and the porous structure 200 is partitioned into a plurality of regions as illustrated in FIG. 1, the closest inlet region A1 of the porous structure 200 may be provided in a region facing the first reaction region 130a. On the other hand, in a case where each of the reaction region 130 and the porous structure 200 is integrated into one region, the closest inlet region A1 of the porous structure 200 may be defined as a region of the inlet region E1 horizontally facing the fluid inlet part 110, which is an upper region of the inlet region E1 with reference to FIG. 1.

Here, according to the first exemplary embodiment of the present disclosure, the number of pores per unit volume in the inlet region E1 of the porous structure 200 may be less than the number of pores per unit volume of the porous structure 200 in other regions except for the inlet region E1 in the porous structure 200.

As described above, the degradation of the fuel cell including the reaction surface 20 may occur most frequently around the closest inlet region A1 of the porous structure 200, but the degradation may also occur relatively easily in the inlet region E1 of the porous structure 200 directly receiving the fluid from the fluid inlet part 110, compared to in the other regions of the porous structure 200. Thus, according to the first exemplary embodiment of the present disclosure, as the number of pores per unit volume in the inlet region E1 of the porous structure 200 is made relatively small, the degradation may be prevented from occurring on the reaction surface 20 facing the inlet region E1 of the porous structure 200.

Also, according to the first exemplary embodiment of the present disclosure, the numbers of pores per unit volume may be different from each other even within the inlet region E1 of the porous structure 200. For example, the number of pores per unit volume in the inlet region of the first porous structure provided to face the first reaction region 130a may be less than the number of pores per unit volume in the inlet region of the second porous structure provided to face the second reaction region 130b. On the other hand, the number of pores per unit volume of the third porous structure provided to face the third reaction region 130c may be constant over all regions of the third porous structure. As described above, the number of pores per unit volume is configured to change by regions of the porous structure 200 because the degradation may relatively easily occur on the reaction surface 20 which faces a region of the inlet region E1 of the porous structure 200, adjacent to the fluid inlet part 110, but the degradation relatively little occurs on the reaction surface 20 which faces a region of the inlet region E1 of the porous structure 200, away from the fluid inlet part 110.

Also, according to the first exemplary embodiment of the present disclosure, in other regions except for the inlet region E1 of the porous structure 200, the numbers of pores per unit volume of the porous structure 200 may be the same as each other. For example, referring to FIG. 1, in the other regions except for the inlet regions of the first to third porous structures, the numbers of pores per unit volume of the first to third porous structures may be the same as each other.

Figure 3:
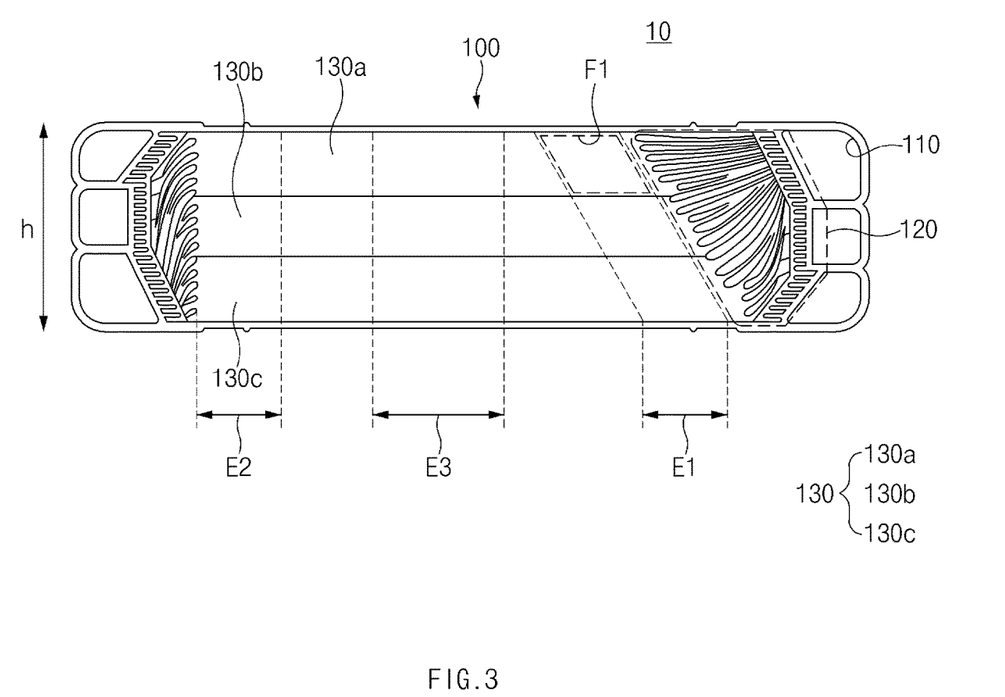
FIG. 3 is a plan view illustrating a structure of a separator for a fuel cell according to a second exemplary embodiment of the present disclosure.

FIG. 3 is a plan view illustrating a structure of a separator for a fuel cell according to a second exemplary embodiment of the present disclosure.

Similar to the first exemplary embodiment of the present disclosure, a separator for a fuel cell (hereinafter, referred to as a separator 10) according to the second exemplary embodiment of the present disclosure may include a separator body 100, as illustrated in FIG. 3.

Also, the separator body 100 may include: a fluid inlet part 110 having a space into which a fluid is introduced; a reaction region 130 to receive the fluid from the fluid inlet part 110; and a diffusion part 120 which is provided between the fluid inlet part 110 and the reaction region 130 and has a passage to provide a path through which the fluid within the fluid inlet part 110 is supplied to the reaction region 130.

Also, in the separator 10 according to the second exemplary embodiment of the present disclosure, a porous structure 200 may be stacked on one surface of the separator body 100. In particular, the porous structure 200 may be stacked on one surface of the reaction region 130. Descriptions of both the content that fluid supplied to the fluid inlet part 110 is supplied to the reaction region 130 via the diffusion part 120 and the principle that the fluid supplied into the reaction region 130 is supplied to the reaction surface including the electrode will be replaced with the above descriptions of the separator according to the first exemplary embodiment of the present disclosure.

Also, even in the separator 10 according to the second exemplary embodiment of the present disclosure, the reaction region 130 provided in the separator 10 may have a plurality of regions as illustrated in FIG. 3. For example, the reaction region 130 may include a first reaction region 130a, a second reaction region 130b, and a third reaction region 130c. Here, FIG. 3 illustrates a state in which the first to third reaction regions 130a, 130b, and 130c are partitioned separately from each other. However, unlike this configuration, the plurality of reaction regions including the first to third reaction regions 130a, 130b, and 130c may be connected and integrated with each other.

Also, as described above, the porous structure 200 may be stacked on the one surface of the reaction region 130, and the reaction region 130 may include the first to third reaction regions 130a, 130b, and 130c. Thus, the porous structure 200 may include a first porous structure stacked on one surface of the first reaction region 130a, a second porous structure stacked on one surface of the second reaction region 130b, and a third porous structure stacked on one surface of the third reaction region 130c. The first to third porous structures may be partitioned separately from each other, but unlike this configuration, the first to third porous structures may be connected and integrated with each other.

Also, the first to third reaction regions 130a, 130b, and 130c may be arranged in one direction on the basis of a distance from the fluid inlet part 110. That is, as illustrated in FIG. 3, the first reaction region 130a and the second reaction region 130b may be disposed so that a distance between the first reaction region 130a and the fluid inlet part 110 is less than a distance between the second reaction region 130b and the fluid inlet part 110. Also, the second reaction region 130b and the third reaction region 130c may be disposed so that a distance between the second reaction region 130b and the fluid inlet part 110 is less than a distance between the third reaction region 130c and the fluid inlet part 110.

According to another aspect of the present disclosure, some regions of the porous structure 200 of the separator 10 have a shape curved in the opposite direction to a direction facing the fluid inlet part 110, compared to the other regions. That is, according to the second exemplary embodiment of the present disclosure, when a region of the porous structure 200, which faces the diffusion part 120, is referred to as an 'inlet region E1', and an inlet region of the inlet region E1, which is provided at the same height as the fluid inlet part 110 in a height direction h, is referred to as a 'same height inlet region F1', the same height inlet region F1 of the porous structure 200 may be provided closer to a central region E3 of the porous structure 200 than a region except for the same height inlet region F1 in the inlet region of the porous structure 200. More preferably, the inlet region E1 of the porous structure 200 may be closer to the central region E3 of the porous structure 200 as the inlet region E1 is closer to the fluid inlet part 110 in the height direction (h) of the fluid inlet part 110.

According to the second exemplary embodiment of the present disclosure, the same height inlet region F1 of the porous structure 200 has a shape closer to the central region E3 of the porous structure 200, a distance between the same height inlet region F1 of the porous structure 200 and the fluid inlet part 110 become increased, compared to the related art. Thus, an amount of a fluid supplied to the same height inlet region F1 of the porous structure 200 is reduced, and accordingly, the degradation on a reaction surface facing the same height inlet region F1 may be prevented. Particularly, according to a further preferred exemplary embodiment, the inlet region E1 of the porous structure 200 has a shape closer to the central region E3 as the inlet region E1 is closer to the fluid inlet part 110 in a height direction h of the fluid inlet part 110, and thus, compared to the related art, the degradation on a reaction surface facing a region of the inlet region E1 of the porous structure 200, which is relatively close to the fluid inlet part 110, may be prevented.

Also, according to the present disclosure as illustrated in FIG. 3, an outlet region E2 through which the supplied fluid is discharged may be provided on an opposite side of the inlet region E1 of the porous structure 200. Here, according to the present disclosure, a boundary of the outlet region E2 in the porous structure 200 may extend in a direction perpendicular to a direction in which the porous structure 200 extends from the inlet region E1 to the outlet region E2. This may be understood as the boundary of the porous structure 200 in the outlet region E2 does not have a curved shape or a recessed shape, but has a straight line shape.

Also, according to the second exemplary embodiment, a distance between the fluid inlet part 110 and the inlet region of the first porous structure provided to face the first reaction region 130a may be the same as a distance between the fluid inlet part 110 and the inlet region of the second porous structure. In this case, a movement distance of the fluid supplied from the fluid inlet part 110 to the first reaction region 130a and the first porous structure is the same as a movement distance of the fluid supplied from the fluid inlet part 110 to the second reaction region 130b and the second porous structure, and thus, the degradation on the reaction region facing the same height inlet region F1 due to the fluid intensively supplied to the inlet region (that is, the same height inlet region F1) closest to the fluid inlet part 110 may be prevented from occurring.

Figure 4:
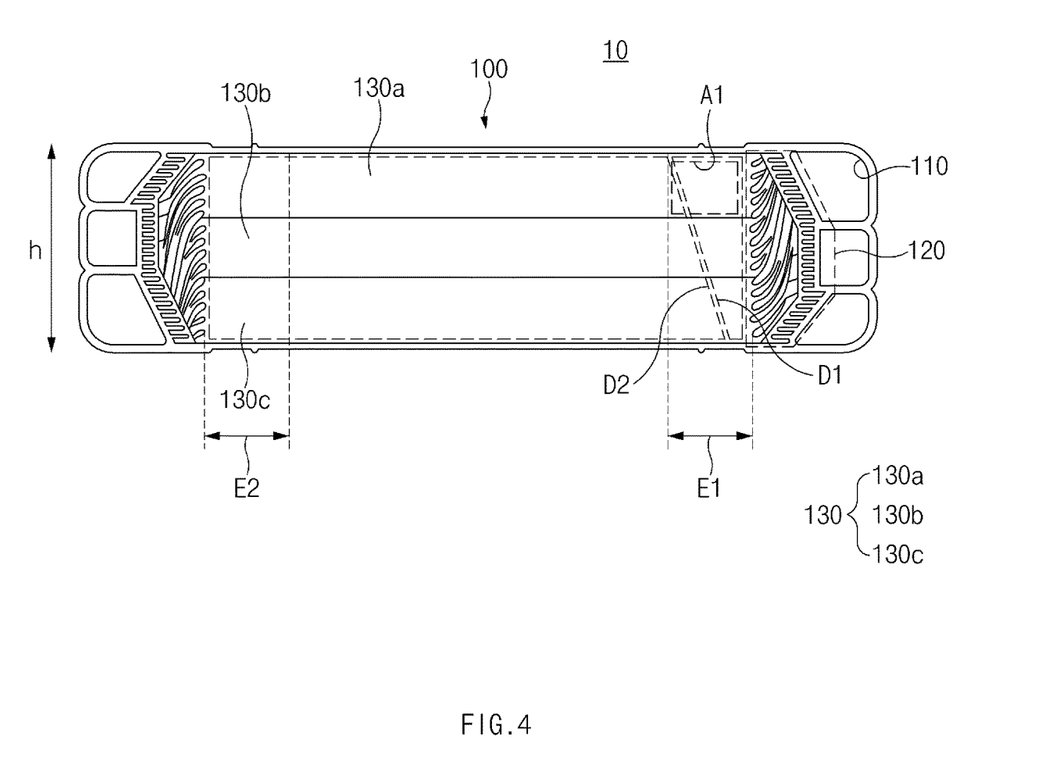
FIG. 4 is a plan view illustrating a structure of a separator for a fuel cell according to a third exemplary embodiment of the present disclosure.

FIG. 4 is a plan view illustrating a structure of a separator for a fuel cell according to a third exemplary embodiment of the present disclosure.

Similar to the first exemplary embodiment and the second exemplary embodiment of the present disclosure, a separator for a fuel cell (hereinafter, referred to as a separator 10) according to the third exemplary embodiment of the present disclosure may include a separator body 100, as illustrated in FIG. 4.

Also, the separator body 100 may include: a fluid inlet part 110 having a space into which a fluid is introduced; a reaction region 130 to receive the fluid from the fluid inlet part 110; and a diffusion part 120 which is provided between the fluid inlet part 110 and the reaction region 130 and has a passage to provide a path through which the fluid within the fluid inlet part 110 is supplied to the reaction region 130.

Also, in the separator 10 according to the third exemplary embodiment of the present disclosure, a porous structure 200 may be stacked on one surface of the separator body 100. In particular, the porous structure 200 may be stacked on one surface of the reaction region 130. Descriptions of both the content that fluid supplied to the fluid inlet part 110 is supplied to the reaction region 130 via the diffusion part 120 and the principle that the fluid supplied into the reaction region 130 is supplied to the reaction surface including the electrode will be replaced with the above descriptions of the separator according to the first exemplary embodiment of the present disclosure.

Also, even in the separator 10 according to the third exemplary embodiment of the present disclosure, the reaction region 130 provided in the separator 10 may have a plurality of regions as illustrated in FIG. 4. For example, the reaction region 130 may include a first reaction region 130a, a second reaction region 130b, and a third reaction region 130c. Here, FIG. 4 illustrates a state in which the first to third reaction regions 130a, 130b, and 130c are partitioned separately from each other. However, unlike this configuration, the plurality of reaction regions including the first to third reaction regions 130a, 130b, and 130c may be connected and integrated with each other.

Also, as described above, the porous structure 200 may be stacked on the one surface of the reaction region 130, and the reaction region 130 may include the first to third reaction regions 130a, 130b, and 130c. Thus, the porous structure 200 may include a first porous structure stacked on one surface of the first reaction region 130a, a second porous structure stacked on one surface of the second reaction region 130b, and a third porous structure stacked on one surface of the third reaction region 130c. The first to third porous structures may be partitioned separately from each other, but unlike this configuration, the first to third porous structures may be connected and integrated with each other.

Also, the first to third reaction regions 130a, 130b, and 130c may be arranged in one direction on the basis of a distance from the fluid inlet part 110. That is, as illustrated in FIG. 4, the first reaction region 130a and the second reaction region 130b may be disposed so that a distance between the first reaction region 130a and the fluid inlet part 110 is less than a distance between the second reaction region 130b and the fluid inlet part 110. Also, the second reaction region 130b and the third reaction region 130c may be disposed so that a distance between the second reaction region 130b and the fluid inlet part 110 is less than a distance between the third reaction region 130c and the fluid inlet part 110.

Here, according to the third exemplary embodiment of the present disclosure, the porous structure 200 of the separator 10 may include not only a pore formation region which has a plurality of pores but a passage formation region which is provided in a region facing a passage provided in the diffusion part 120 of the separator body 100.

That is, according to the third exemplary embodiment, the porous structure 200 may be stacked on the one surface of the reaction region 130. When a region of the porous structure 200, which faces the diffusion part 120, is referred to as an 'inlet region E1', and an inlet region A1 of the inlet region E1, which is closest to the fluid inlet part 110, is referred to as a 'closest inlet region', a passage formation region D1 provided to face the passage of the diffusion part 120 may be provided in the closest inlet region A1 of the porous structure 200, and a pore formation region D2 having a porous pore structure may be provided in a region except for the passage formation region D1 in the porous structure 200. FIG. 4 illustrates a state in which the passage formation region D1 is provided in a portion of the closest inlet region A1.

Here, according to the third exemplary embodiment, the passage formation region D1 of the porous structure 200 may have a shape protruding toward a central region of the porous structure 200 as the passage formation region D1 is closer to the fluid inlet part 110 in a height direction h of the fluid inlet part 110. This may be understood that the passage formation region D1 of the porous structure 200 may have a shape curved toward the central region of the porous structure 200 as the passage formation region D1 is closer to the fluid inlet part 110 in the height direction h of the fluid inlet part 110.

As described above, according to the third exemplary embodiment, the passage formation region D1 may be provided in the closest inlet region A1 of the porous structure 200, and more preferably, the passage formation region D1 of the porous structure 200 may have a shape protruding toward the central region of the porous structure 200 as the passage formation region D1 is closer to the fluid inlet part 110 in the height direction h of the fluid inlet part 110. In this case, similar to the second exemplary embodiment, the degradation on the reaction region facing the closest inlet region A1 due to the fluid intensively supplied to the inlet region (that is, the closest inlet region A1) closest to the fluid inlet part 110 may be prevented from occurring.

Also, as described above, the reaction region 130 may include the first reaction region 130a and the second reaction region 130b, and the porous structure 200 may include the first porous structure stacked on the one surface of the first reaction region 130a and the second porous structure stacked on the one surface of the second reaction region 130b. Here, according to the third exemplary embodiment, the passage formation region D1 provided in the inlet region of the first porous structure may have a shape further protruding from the passage formation region D1 provided in the inlet region of the second porous structure toward the central region of the porous structure 200. Thus, according to the third exemplary embodiment, the pore formation region D2 provided in the first porous structure may have a shape further curved from the pore formation region D2 provided in the second porous structure toward the central region of the porous structure 200.

Figure 5:
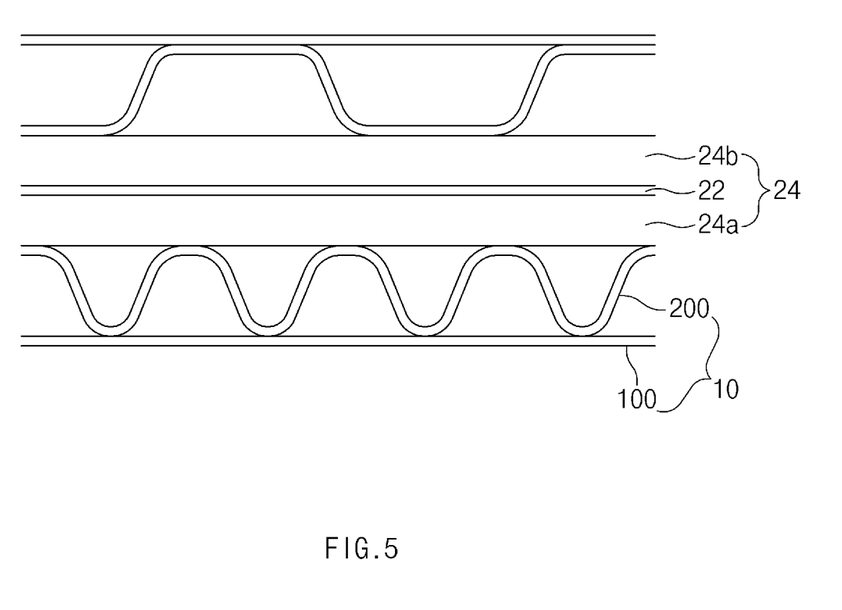
FIG. 5 is a cross-sectional view illustrating a stack structure of a fuel cell according to one example of the present disclosure.

FIG. 5 is a cross-sectional view illustrating a stack structure of a fuel cell according to one example of the present disclosure.

Referring to FIG. 5, a fuel cell according to the present disclosure may include: a membrane electrode assembly (MEA) 22 including a membrane, a fuel electrode, and an air electrode; a gas diffusion layer 24 stacked on one surface of the MEA 22; and a separator 10 stacked on one surface of the gas diffusion layer 24. The gas diffusion layer 24 may include an air diffusion layer 24a stacked on one surface of the MEA 22 and a fuel diffusion layer 24b stacked on the other surface of the MEA 22.

As described above, the separator 10 may include a separator body 100 and a porous structure 200 which is stacked on one surface of the separator body 100 and has a plurality of pores defined therein to provide a path through which a fluid flows. Also, as described above, the separator body 100 may include: a fluid inlet part 110 having a space into which the fluid is introduced; a reaction region 130 to receive the fluid; and a diffusion part 120 which is provided between the fluid inlet part 110 and the reaction region 130 and has a passage to provide a path through which the fluid within the fluid inlet part 110 is supplied to the reaction region 130 (see FIGS. 1, 3, and 4). Also, the reaction surface 20 (see FIG. 2) may include the MEA 22 and the gas diffusion layer 24 of the fuel cell according to the present disclosure.

Here, the shapes of the fluid inlet part and the diffusion part described and illustrated in the present specification and drawings are merely illustrative, and the present disclosure may be applied regardless of the specific shapes of the fluid inlet part and the diffusion part.

According to the present disclosure, the constant amount of air is supplied to the fuel cell irrespective of the positions within the air channel, and thus, the degradation of the fuel cell may be prevented.

Although the present disclosure is described by specific embodiments and drawings as described above, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A separator for a fuel cell, comprising:
    a separator body; and
    a porous structure which is stacked on one surface of the separator body and has a plurality of pores defined therein to provide a path through which a fluid flows,
    wherein the separator body comprises:
    a fluid inlet part having a space into which the fluid is introduced;
    a reaction region configured to receive the fluid; and
    a diffusion part which is provided between the fluid inlet part and the reaction region and has a passage to provide a path through which the fluid within the fluid inlet part is supplied to the reaction region,
    wherein the porous structure is stacked on one surface of the reaction region, and
    the number of pores per unit volume of the porous structure in a first inlet region closest to the fluid inlet part in an inlet region of the porous structure facing the diffusion part, is less than the number of pores per unit volume of the porous structure in a second inlet region except for the first inlet region in the inlet region of the porous structure facing the diffusion part.

2. The separator of claim 1, wherein the number of pores per unit volume of the porous structure in the inlet region of the porous structure is less than the number of pores per unit volume of the porous structure in the other regions except for the inlet region in the porous structure.

3. The separator of claim 1, wherein the fluid is air.

4. The separator of claim 1, wherein the reaction region comprises a first reaction region and a second reaction region, and
    the porous structure comprises:
    a first porous structure stacked on one surface of the first reaction region; and
    a second porous structure stacked on one surface of the second reaction region,
    wherein the first reaction region and the second reaction region are disposed so that a distance between the first reaction region and the fluid inlet part is less than a distance between the second reaction region and the fluid inlet part, and
    the number of pores per unit volume in the inlet region of the first porous structure is less than the number of pores per unit volume in the inlet region of the second porous structure.

5. The separator of claim 4, wherein the reaction region further comprises a third reaction region, and
    the porous structure further comprises a third porous structure stacked on one surface of the third reaction region,
    wherein the third reaction region is disposed so that a distance between the second reaction region and the fluid inlet part is less than a distance between the third reaction region and the fluid inlet part, and
    the number of pores per unit volume of the third porous structure is constant over all regions of the third porous structure.

6. The separator of claim 5, wherein in other regions except for the inlet regions of the first to third porous structures,
    the numbers of pores per unit volume of the first to third porous structures are the same as each other.

* * * * *